US005654746A

United States Patent [19]
McMullan, Jr. et al.

[11] Patent Number: 5,654,746
[45] Date of Patent: Aug. 5, 1997

[54] SECURE AUTHORIZATION AND CONTROL METHOD AND APPARATUS FOR A GAME DELIVERY SERVICE

[75] Inventors: Jay C. McMullan, Jr., Doraville; David B. Burleson, Roswell; Paul Borsetti, Jr., Alpharetta; John T. Filion, Lawrenceville, all of Ga.

[73] Assignee: Scientific-Atlanta, Inc., Norcross, Ga.

[21] Appl. No.: 352,162

[22] Filed: Dec. 1, 1994

[51] Int. Cl.⁶ .............................. H04N 7/10; H04H 1/02; H04H 7/00
[52] U.S. Cl. .............................. 348/6; 348/10; 455/6.2; 455/6.3
[58] Field of Search .............................. 348/6, 7, 10, 12, 348/13; 455/3.1, 4.1, 4.2, 5.1, 6.1, 6.2, 6.3; H04N 7/10

[56] References Cited

U.S. PATENT DOCUMENTS 5,231,665  7/1993  Auld et al. .................................. 348/6

Primary Examiner—John K. Peng
Assistant Examiner—John W. Miller
Attorney, Agent, or Firm—Banner & Witcoff, Ltd.

[57] ABSTRACT

A communications system for the delivery of digital data programs to a remote location includes a transmitter for transmitting a signal having the digital data programs and a communications terminal located at the remote location. The communications terminal includes a control circuit including authorizing circuitry responsive to authorization data for authorizing the communications terminal to access authorized ones of the digital data programs in one of a first and a second authorization mode. For example, automatic authorization modes for game play may comprise an arcade mode and a rental mode, simulating manual access methods i.e. paying for play at a video arcade or for rental of games from a video game store. Moreover, new games may be accessed without charge by the game player if authorized according to a free service authorization map. Furthermore, parents may limits game play to children prior to a particular time of day such as bed-time or to a maximum playtime limit according to a secret downloadbale password known only to the parents. A game player may only read and not write authorization and control data.

46 Claims, 11 Drawing Sheets

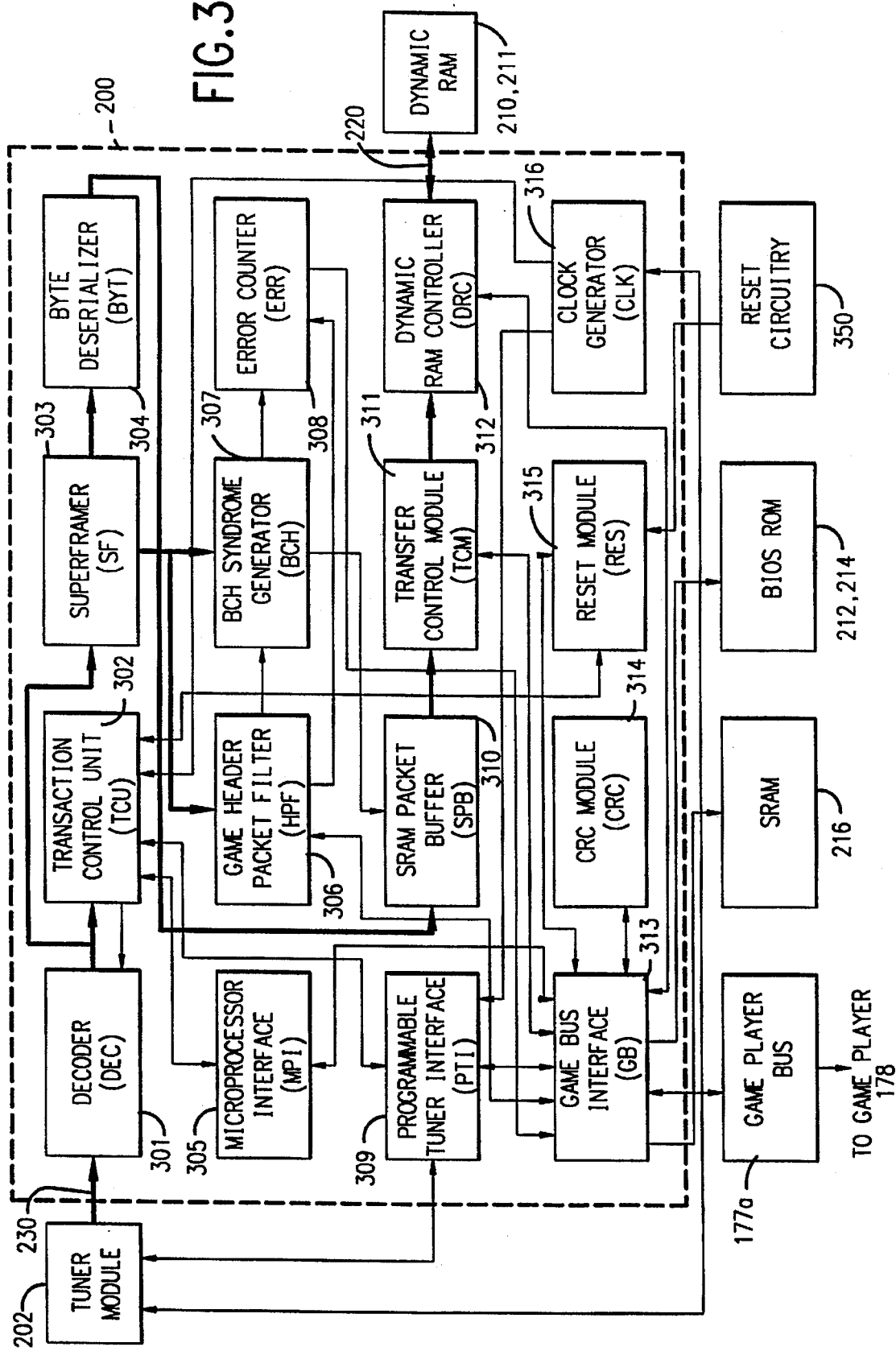

SECURE AUTHORIZATION AND CONTROL METHOD AND APPARATUS FOR A GAME DELIVERY SERVICE

FIELD OF THE INVENTION

The present invention relates to the field of subscription service systems generally and, more particularly, to the field of authorization and control of game delivery services. More generally, the present invention relates to a system for delivering services to subscribers and, more particularly, to an access control feature for a system for delivering digitally based services to subscribers.

DESCRIPTION OF THE RELATED ART

Television video game systems such as those available from Atari, Nintendo and Sega, among others, typically include a game player which is connected to a standard television set. The game player is adapted to receive a removable game cartridge having a video game program stored therein. The game player includes a processor which executes the video game program on the cartridge. Input devices such as joysticks permit a user to play the game. Different games may be played by placing different cartridges in the game player. These cartridges are generally either purchased or rented from video stores. There are, however, several disadvantages to this mode of distribution of television video games. First, game cartridges can be expensive to purchase. This expense can be prohibitive to parents whose children desire to play the most currently popular video games. In addition, the popularity of many games diminishes over time. Thus, game cartridges must be continuously purchased in order to include the currently popular games. Renting the games from a video store overcomes some of these problems, but the games are subject to availability and may only be rented for short periods of time.

One way to address some of these problems is to deliver video games over cable television systems. The volume of information and number of features being made available to subscribers in such systems are continuously increasing. For example, the advent of optical fiber networks and links to telecommunication networks enables an almost limitless supply of information and features to be provided to subscribers. Already subscription television systems are being used for text services such as sports scores, stock quotations, weather reports, and news updates. Relatively new features such as home shopping, travel reservations service, home banking, energy management, home security (fire or burglar alarm), video conferencing and other such services are also being provided.

When such systems are used to deliver video games, it is desirable that the system operator and/or subscriber be able to control access to the video games. This control is desirable in a number of respects. First, it may be desirable to provide certain games on a premium basis. For example, a system operator may want to provide previews of new or updated game releases or currently popular games for an additional service fee. It may also be desirable to permit a parent to limit a child's access to games to particular times of the day.

SUMMARY OF THE INVENTION

In accordance with one aspect of the instant invention, a communications system for the delivery of digital data programs to a remote location includes a transmitter for transmitting a signal having the digital data programs and a communications terminal located at the remote location. The communications terminal includes a control circuit including authorizing circuitry responsive to authorization data for authorizing the communications terminal to access an authorized one of the digital data programs in one of a first and a second authorization mode.

In accordance with another aspect of the instant invention, a communications system for the delivery of digital data programs to a plurality of remote locations includes communications terminals located at the remote locations and a transmitter for transmitting a signal having the digital data programs. The transmitter also transmits first authorization data for authorizing all of the communications terminals to access a first authorized one of the digital data programs, and second authorization data for authorizing respective ones of the communications terminals to access a second authorized one of the digital data programs.

In accordance with yet another aspect of the instant invention, a communications system for the delivery of digital data programs to a remote location includes a control system for transmitting a signal comprising the digital data programs and authorization transactions. The authorization transactions include identifier data corresponding to one or more of the digital data programs, load phase data, and memory slot data. A communications terminal is located at the remote location. The communications terminal includes a memory for storing an authorization table for authorizing the communications terminal to access an authorized one of the digital data programs. The authorization table includes a plurality of memory slots, each memory slot including a first field for storing load phase data and a second field for storing identifier data. A control circuit processes the authorization transactions using the memory slot data to access one of the memory slots of the authorization table, wherein the identifier data is loaded into the corresponding memory slot (1) if identifier data currently stored in the corresponding memory slot corresponds to the identifier data in the processed authorization transaction and load phase data currently stored in the corresponding memory slot differs from the load phase data in the processed authorization transaction or (2) if identifier data currently stored in the corresponding memory slot differs from the identifier data in the processed authorization transaction.

According to the present invention, the first and second authorization modes may comprise a rental mode and an arcade mode for game delivery services. The home communications terminal comprises, in the first instance, a game adapter, and, in the second instance, a game player. Authorization data and game data are transmitted periodically from a transmitter toward the home communications terminal and the home communications terminal only provides limited access to game data by the game player.

The home communications terminal is particularly secure from service pirates. The game data and authorization and control data are transmitted in a secure manner. Authorization data can only be read from the game adapter by the game player and not written into game adapter memory.

These and other features of the present invention will be described more fully in accordance with the appended drawings.

BRIEF DESCRIPTION OF THE DRAWINGS

FIG. 3 is a functional block diagram of the secure game controller ASIC 200 of FIG. 2;

FIG. 4c shows a pay to play memory comprising n pay to pay memory slots; FIG. 4d shows an exemplary arcade mode memory slot of the pay to play memory of FIG. 4c having a mode bit, M, a playtime value, PT, a service identifier, Service ID, and a load phase bit; and FIG. 4e shows a rental mode memory slot having a mode bit, M, a week field, W, a day of week field, DOW, a service identifier, Service ID, and a load phase bit;

DETAILED DESCRIPTION

Figure 1:
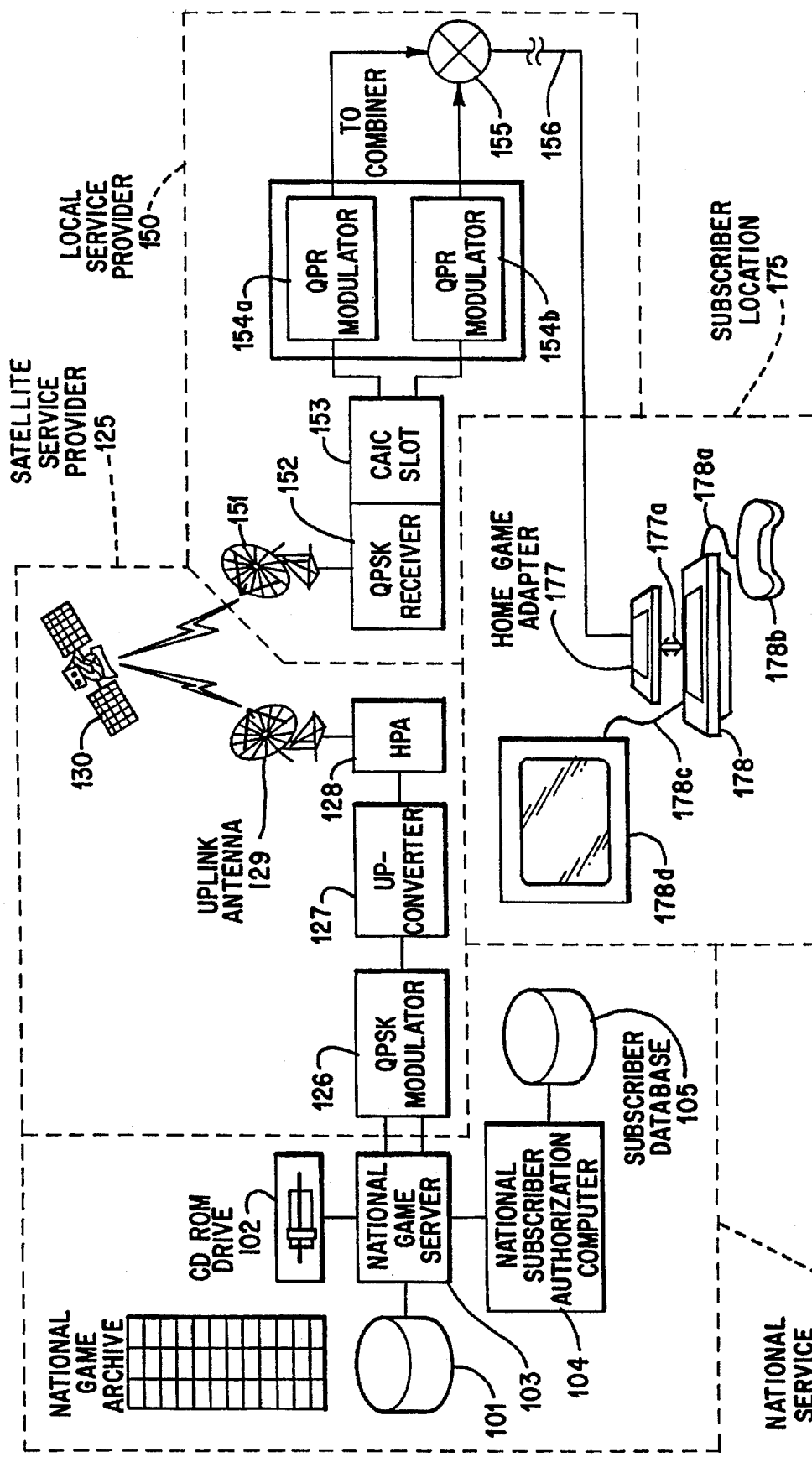
FIG. 1 is a block schematic diagram of a game delivery system in accordance with the present invention showing a national subscriber authorization computer 104 for authorizing game services to a subscriber equipped with a game adapter 177 in accordance with the present invention and a commercially available game player 178 including a game display.

Referring to FIG. 1, there is provided an overall block schematic diagram of a game delivery system according to the present invention for providing game delivery and play services. A similar block schematic diagram of a digital music and game delivery service is provided by FIG. 1 of U.S. Pat. No. 5,239,540, incorporated herein by reference. Pending U.S. applications Ser. No. 08/171,453, filed Dec. 22, 1993, having one of the present inventors as a co-inventor, and Ser. No. 09/253,698, filed Jun. 3, 1994, comprising related subject matter, are likewise incorporated herein by reference. Referring to FIG. 1 of any of these, there is shown an overall block diagram of a digital music and game delivery service. In particular, a centralized source of game and digital music material provides game data which is encoded, multiplexed and transmitted via satellite to a cable television service provider (or directly to a subscriber's home). At the cable television service provider, the digital music (or games or software) is received, having been modulated with other frequency division multiplexed services (television, telecommunications, games or software or other services) to be received at a digital music tuner device at a subscriber's home.

In accordance with the present invention, the subscriber's home may be provided with a cable television service terminal, a digital music tuner for digital music services, a game adapter 177 according to the present invention, a home computer terminal, a telecommunications terminal and/or other home communications terminal apparatus. For example, none of the telecommunications terminal, the digital music tuner, the cable television service terminal or other such apparatus are shown in FIG. 1 of the present application. Nevertheless, it may be assumed, referring briefly to FIG. 2, that RF input 201 may be provided in common to any of the three, four (or more) devices. For example, a personal computer terminal, telecommunications terminal or specialized terminals for burglar alarm, energy management or other services may comprise other devices coupled to RF input 201 in common with game adapter 177.

Particular details of the multiplex arrangement for the present invention are described by U.S. Pat. No. 5,239,540 and its progeny in further FIGS. 2–8 and their attendant descriptions, incorporated herein as necessary by reference. Suffice it to say that in each instance in which digital audio data, stations or channels or the like are described in each of these, the terminology game data, game channels, game data streams or the like may be suitably replaced therefor, well within the skill of one of ordinary skill in the art.

Figure 2:
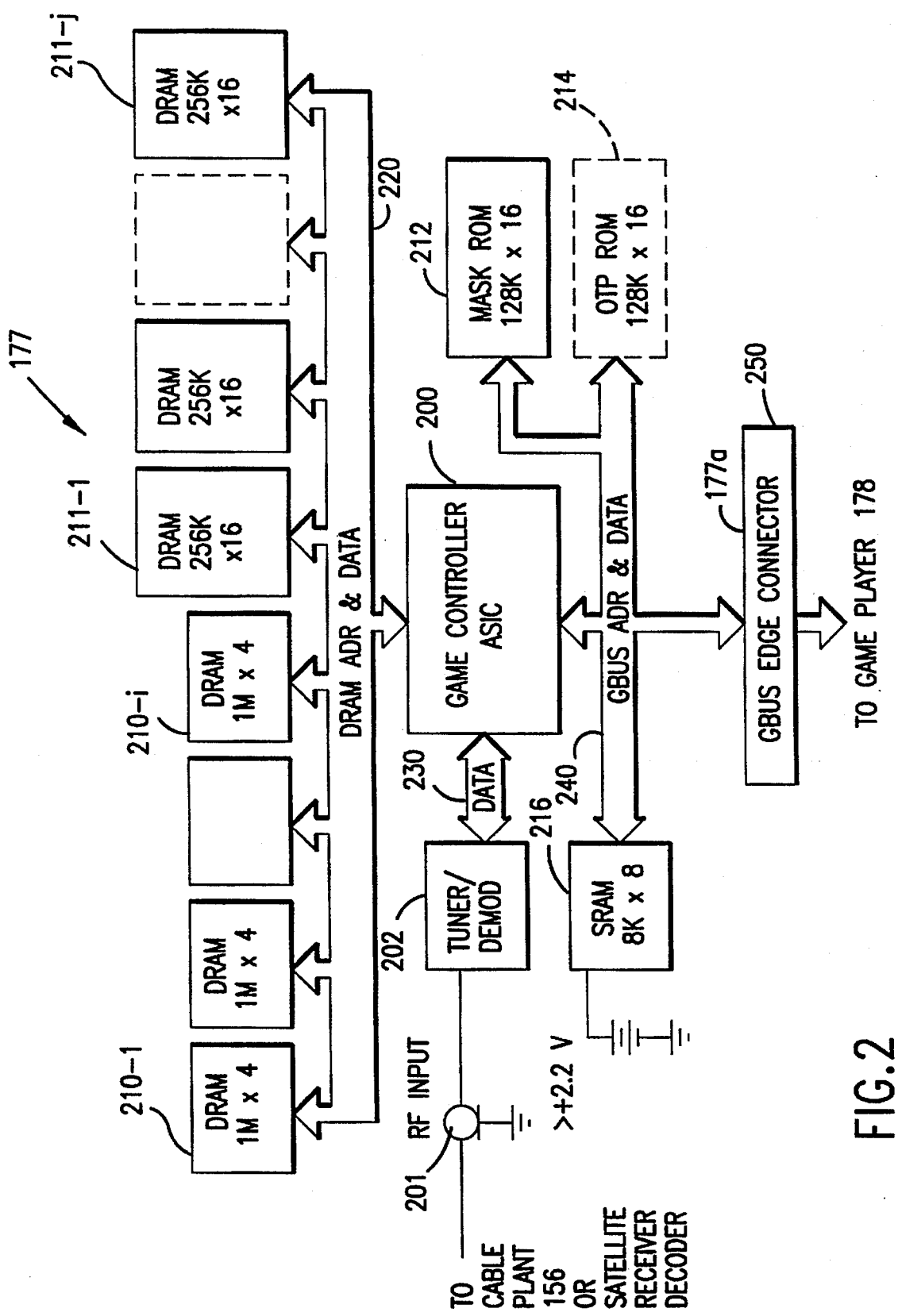
FIG. 2 is a detailed schematic block diagram of the game adapter 177 of FIG. 1 according to the present invention including a secure game controller application specific integrated circuit (ASIC) 200 according to the present invention.

Referring again to FIG. 1 of the present application, there is shown the location of a national service provider 100 for providing game delivery services to subscribers. The national service provider may provide a national game archive 101 of games available for play. Games are selected from the archive and played via drive 101. Selected games may be retrieved by national game server 101, encrypted prior to storage as appropriate according to a proprietary algorithm and stored on compact discs (CD) or tape or cartridge and played by an appropriate plurality of drives comprising at least one high speed drive, such as drive 101. CD ROM drive 102 may be used to update the files, encrypting new game data for storage in the drive 101. There may be one or a plurality of such game drives 101 as shown in FIG. 2 of U.S. Pat. No. 5,239,540 for providing a plurality of game data streams simultaneously. The game data may be time division multiplexed together for a plurality of games for transmission over the same channel frequency. The national game server 103 accesses the game data as appropriate and also refers to the national subscriber authorization computer 104 for subscriber authorization data. The national subscriber authorization computer 104, in turn, has access to a national subscriber database 105.

Games typically range in size from 4 to 32 or more megabits of storage capacity and, in accordance with the present invention, may require as long as a minute to download. Of course, the less capacity taken by game data, the faster the delivery and the more satisfied the subscriber will be with the game delivery service. Consequently, game data delivery should be at high data rates on the order of megabits per second, for example, one or more 3 megaHertz bandwidth channels.

The national game server system 103 encodes the data for many games and outputs encoded game data and subscriber authorization control data in a format as will be further described herein for delivery via satellite, for example, to a local area. The satellite service provider may be a separate entity from the national game service provider who provides satellite direct-to-home services direct to subscriber location 175. Alternatively, the national service provider may provide the game delivery service to a local service provider such as a cable or telecommunications service provider 150. Suitable modifications, not shown, would be incorporated to FIG. 1 to show direct satellite to home service, for example, where the home location 175 would further incorporate a satellite dish 131 and decoder (not shown).

Typically, assuming the satellite service provider is associated with the national service provider, the game and control data is provided to quadrature phase shift key (QPSK) modulator 126 for upconversion to an appropriate satellite intermediate frequency via upconverter 127. Other forms of modulation may be suitably utilized besides QPSK in other embodiments. For example, for QPSK modulator 126, modulator 126 may provide signals at an intermediate frequency of 70 megaHertz to upconverter 128. A suitable high power amplifier (HPA) 128 may be provided at the output of upconverter 127 to maintain a suitable power level to uplink antenna 129 for transmission to satellite 130. Typically, the satellite system may be a typical ku, L- or C-band satellite system available from Scientific-Atlanta, Inc. Satellite 130, in turn, transmits the received signal to a so-called footprint of the earth's domain. Consequently, several satellites may be required for a national or world game delivery service. Several satellites 130 will provide an appropriate plurality of geographically different footprints for a truly world-wide service.

At the location of a local cable television or telecommunications service provider, the game data signals are received at satellite receive antenna 131 and demodulated at QPSK receiver 132. In an alternative embodiment, game data may be encrypted and transferred to discs for transmission by mail or otherwise than by radio frequency to local service provider 150. There, the local service provider may provide their own disc drive 102 for game delivery services and a digital service control system (DCS) computer (not shown). Demodulated game data is provided to a conditional access insertion card (CAIC) 133 for forwarding via quadrature partial response (QPR) modulators 154a and 154b to cable combiner 155. Again, QPR modulation, for example, nine state QPR, is suggested as one alternative modulation form. Other digital data delivery modulation schemes which may be utilized in the alternative include quadrature amplitude modulation QAM and vestigial sideband VSB. At combiner 155, the game signals on a first (or more) frequency division multiplexed channel are combined with other service channels such as digital music, cable television, telecommunications, computer software channels and the like. All of these signals are then transmitted via cable distribution plant 156 to a subscriber location 175. The cable distribution plant 156 may comprise a twisted cable pair (telecommunications), coaxial cable or fiber optic signal distribution plant or combination thereof known in the art. Typically, the game delivery service signals are frequency division multiplexed at a selected channel in the 50–150 megahertz range but may, optionally be provided anywhere in a 0–2 gigahertz optical fiber cable television spectrum.

At a subscriber location 175, there may be located a game service home adapter 177 for timing to and receiving the game data channel(s) and demodulating and decoding game data and subscriber authorization and control data. There may be a plurality of game adapters 177 and game players 178 at the subscriber location 175. Gamer players 178 are generally known for receiving therein a game cartridge, disc or other game software media. In particular, a specially suited game cartridge slot is typically provided in the game player 178 for receiving an edge connector or other means of intercommunicating with the game player 178. In accordance with the present invention, the game cartridge is replaced with the game adapter 177 equipped with a suitable connector 177a which is plug-in compatible with game player 178. In this manner, game player apparatus, such as game player 178, already available in large commercial quantity and played by many already throughout the world need not be replaced. Game data received by home game adapter 177 appears to the game player 178 in the same manner as that data received from a game cartridge presently available through commercial outlets in great quantities.

Game player 178 will not be described in great detail. One example of such game apparatus is the so-called Genesis (R) game player system available from Sega Corporation of America. Other similar systems are available from other manufacturers including, but not limited to, Atari and Nintendo. Typically, such a game player has its own microprocessor, random access memory and program memory for storage of initialization, basic input/output services (BIOS), game access programs and the like. The game player 178 may comprise one single housing with built-in display and player input devices. According to FIG. 1, a game player 178 may comprise separate components including for example, a main unit 178, a lap input unit 178b, and a display 178d which may comprise a television receiver all connected via appropriate cords or wireless connections 178a and 178c. The game player is actuated via key, joystick or other known controls during initialization and game play modes of operation. A recent enhancement to such devices is a biofeedback device for placing a player into virtual reality with the game program. The game player BIOS accesses game program cartridge software and plays the game under user control. Different or other suitable arrangements for equipment at subscriber location 175 may come to mind of one of skill in the art, for example, game adapter 177 may communicate with game player 178 or with television 178d by ribbon connector cable, radio frequency cable, optical fiber or wireless means (not shown). Certainly, subscriber location 175 will in all likelihood be provided with multiple televisions 178b and video cassette recorders, cable television terminals, personal computers and telecommunications devices in arrangements too numerous to mention and as appropriate to a particular subscriber's needs. All of these devices may be connected in common to cable distribution plant 156 or alternative distribution plants such as telecommunications cable plants or directly to a downlink satellite antenna feed.

Referring now to FIG. 2, there is provided a block schematic diagram of game adapter 177 for connection to a cable plant 156 at a subscriber location 175 in accordance with FIG. 1. Game adapter 177 comprises an RF input 201 for receiving a broadband of radio frequencies extending in accordance with present technologies into the range of 1–2 gigahertz in bandwidth. Tuner/demodulator 202 tunes to one or more of these frequencies, in particular, a channel on which game data is multiplexed and transmitted as QPR modulated data, for example, on a frequency in the FM band (for example, between 80 and 110 megaHertz). Tuner/demodulator 202, then, may be a standard QPR tuner demodulator similar in construction to the so-called digital music tuner product described by U.S. Pat. No. 5,239,540. Tuner/demodulator 202 under control of game controller ASIC 200 provides demodulated game data streams to an ASIC input data port via a data bus 230 as will be further described herein.

In accordance with the present invention tuner/demodulator 202 is programmable and comprises a known frequency synthesizer integrated circuit. The frequency synthesizer has a serial interface to load tuning words which in turn load internal registers used to change the tuning frequency. In this manner, ASIC 200, as will be further described herein, can program the tuner to tune to any particular frequency within a range, for example, of 50-150 megaHertz.

Game controller ASIC 200 in turn communicates with a plurality of read/write memories including DRAM, FLASH, SRAM, EEPROM or other memory technologies. Without limitation, such memories may comprise dynamic random access memory arrays 210-1 to 210-i and 211-1 to 211-j as shown via dram address and data bus 220, wherein i may be an integer greater than 1 up to four or more and, likewise, j may be an integer from 1 up to two or four or more.

Most importantly, game controller ASIC 200 filters data (determines if the data is for the game adapter or the game player), interprets transactions and, as appropriate, passes transactions on to a processor unit of game player 178 or loads SRAM inside the TCU 302 not shown. Memories of game adapter 177 will appear to game player 178 as if they were, at least, a game cartridge memory of game program data containing a game to be played.

Game adapter ASIC 200 controls access to memories 216, 212 and alternate memory 214 and terminates in Gbus edge connector 250 which is plug-in adaptable to be received into a game cartridge port of game player 178 as if the connector were a game cartridge.

Referring now to FIG. 3, there is shown a detailed functional block diagram of game adapter ASIC 200 of FIG. 2. Game controller ASIC 200 is intended as a secure state machine to which access and output is derived through secure data ports. As will be further described herein, the data entering ASIC 200 is preferably encrypted, interleaved, forward error corrected and otherwise unintelligible to a pirate who would seek to gain access thereto via bus 230. Clock generator 316 generates all the clocks needed for operation of the ASIC 200. The clock generator is synchronized to incoming data retrieved from tuner/modulator 202.

ASIC 200 receives demodulated data from tuner module 202 which preferably includes a programmable phase lock loop tuner including a programmable frequency synthesizer as described above. In this manner, the tuner may be programmably tuned to different programmable frequencies within the control on the national game center location 100 or local service provider 150.

Referring to the Gbus (game player bus) 177a at the lower left of FIG. 3, the bus 177a particularly controls SRAM 216 and BIOS ROM 212, 214 via game bus interface 313. Meanwhile, game bus interface 313 communicates with CRC module 314, microprocessor interface 305, transfer control module 311, programmable tuner interface 309, error counter 308 and game header packet filter 306 for various control functions.

The transaction control unit (TCU) 302 receives transaction data from decoder 301, interprets received transactions and does what is asked of it. The TCU further includes some RAM and ROM, not shown. It further manages the authorization maps and operates the game timers. The various game timers (sometimes referred to herein as counters) including parental control, playtime and the like may be, for example, decremented in ten second intervals, as will be further discussed in connection with FIG. 11. The game player microprocessor communicates with the TCU 302 through the MPI 305. The Transaction Control Unit 302 communicates with the Reset circuitry including module 315 in the event, for example, when playtime expires. Reset module 315 must generate a reset signal sufficient to operate the inherent reset mechanism of game player 178. To the game user, the reset operates the game so as to terminate game play.

The memory maps resident in non-volatile memory and registers are available to the game player microprocessor through the MPI interface 305. The authorization memory maps include bit maps, for authorization, for example, for 128 services. There is both a subscriber authorization map for subscriber authorization to pay services and a free map for services offered free of charge. The free map is for the subscription service provider to provide certain free service offerings, for example, as a stimulus to subscribers.

There are pay to play memory slots which allow authorization to up to, for example, 16, 32, 64 or even 128 different services on a daily basis. The PTP slots define either an arcade mode of service or a rental mode or other modes as will be further described herein. In other words, one or two bits may define the mode. In an arcade mode, the pay to play slot is defined in terms of playtime and service identifier. In the rental mode, the pay to play slot is defined in terms of days of the week and week number. A further bit is used to define a "load phase" as will be further defined herein.

Other registers in random access memory can be provided for features such as timers, resets and the like. One such timer may be a parental timeout and be associated with a parental password. The parental timeout, for example, may be established by a parent entering their password and setting a time limit on game play, for example, in the form of a game play time limit or, alternatively, a deadline time (such as a child's bedtime). The time of day (TOD) transaction may be regarded as to the current time, and convenient decrement intervals of time set utilizing ticks of clock generator 316 may be ten second intervals.

Decoder 301 is also connected via the same data bus (all data buses are indicated in bold or thick lines) to superframer (SF) 303 which interprets superframe data, as will be further described herein. The decoder receives the data bit stream from the tuner 202. The decoder 301 awaits frame lock synchronization, extracts subscriber and mpu transactions, decrypts the game data and then forwards the game data on for further processing. As is well understood in the art, game data and authorization and control data may be encrypted in accordance with a proprietary algorithm for storage in game server archive 101 by first, second or more levels of encryption. For example, keys and/or seeds and/or secret serial numbers of game adapter units may be used in succession where the keys and seeds are periodically transmitted in downloadable transactions.

Further, the game data may be precompressed at the source 100 and decompressed at subscriber location 175 according to well known compression algorithms. Decompression may occur anywhere in the chain comprising elements byte deserializer 304, SRAM packet buffer 310, transfer control module 311 and dynamic ram controller 312 or elsewhere according to design preference.

The superframer 303 runs the forward error correction circuitry BCH syndrome generator 307. BCH 307, in turn, communicates with error counter 308. The forward error correction preferably is Bose Chaudhuri Hocquenghen (BCH) or may be of Solomon type or other forward error correction.

Error counter 308 receives an input from Game Header Packet filter (HPF) 306 in the event of a game header packet error. In particular, the game packet header is scrutinized to assure that the service identifier and game identifier data are valid for eventual transfer to memory. The four main functions of this filter comprise, then, header parsing, packet filtering, game timeout determination and the maintenance of game cycle status.

Meanwhile, the data is provided via superframer 303 to byte deserializer 304 for deserializing the received data streams. In particular, the deserializer converts incoming serial data streams to parallel for storage in SRAM. As it does so it deinterleaves the incoming data. The deserialized data is forwarded via a bus to SRAM packet buffer SPB 310 controlled for error correction by BCH 307. The SPB 310 provides temporary storage for packets as they are being received and deinterleaved and while the packet data is being loaded into DRAM. The SPB 310 forwards the data to the transfer control module (TCM) 311 which is controlled by the game bus interface (GBI) 313. The TCM 311 forwards the data on to dynamic RAM controller (DRC) 312. The TCM 311 is responsible for transferring data from the SPB 310 to the DRAM interface, DRC 312. From there, the dynamic ram controller (DRC) 312 provides data by Dram address and data bus 220 to dram's 210, 211.

Meanwhile, when appropriate, the game bus interface (GBI) acts as if it were a game cartridge with respect to game player 178 when access to a game is authorized via transaction control unit 302.

The data as it is output from tuner 202 comprises data arriving in dibit symbols as per QPR modulation and may be in any of four possible phases, IQ, -IQ, -I-Q, and Q-I (where I is the in-phase signal and Q is the quadrature signal). The data stream may arrive, for example, at a rate of 3 megasymbols per second, forming a composite 6 megabit per second data stream. Depending on the size of the frames of the superframe, data may be received at a rate on the order of 500 to 600 frames per second. In accordance with the present invention, a superframe comprises a pair of frames, each comprising a header and data packets. One of the pair of frames of the superframe may comprise a synchronization frame and the other may be described as a subscriber frame.

The synchronization frame header may include, for example, frame synchronization data and encryption data for decrypting encrypted game and authorization and control data as appropriate. The subscriber frame header contains a subscriber control transaction field (SCTF) which is the mechanism by which the subscriber control commands get sent to the ASIC 200. The SCTF data is preferably error-protected by forward error correction coding and transmitted as a plurality of data packets comprising the SCTF data field. Each SCTF command is in the format shown in FIG. 4, where F comprises a filter code (for example, from one to four bits in length) defining the end destination of the transaction; for example, one filter code may represent the game adapter 177 while another may represent the game player 178, and so on. G represents a global flag to indicate whether the transaction is addressed or global. T represents the transaction command data including any data operatively associated with the command.

Figure 4A:
FIG. 4a is a generalized format for a transaction including a filter code F, a global flag G and a transaction code T, the T data further including any data to be operated upon by the transaction as necessary.
Figure 4B:
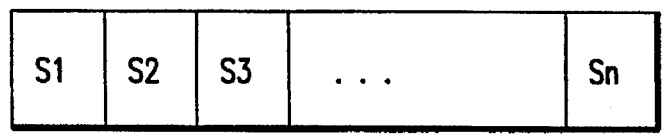
FIGS. 4b to 4e describe authorization memories of ASIC 200 of FIG. 3; in particular, FIG. 4b describes a format for a service authorization memory for subscription or free service, S1 ... Sn representing authorization bits for services identified by service identifiers S1 ... Sn.

Referring now to FIG. 4b, there is shown a service authorization memory table for either free or subscription game service. The memory table comprises a plurality of bit positions which are either in a first state or a second state indicating AUTH or DEAUTH. For example, some commands for loading a service authorization map will further include data representing the data values to be loaded into the map. If there are 128 possible service identifiers (sometimes referred to herein as SID's), a service authorization map (or data to be loaded therein) will contain an authorization bit S1 to Sn, where n is equal to 128, for each service, the bit being in one state indicating "authorized" and the bit being in its other state representing "not authorized". Loading of authorization memory tables 4b for free or subscription service will be further described in connection with the discussion of FIGS. 6-8 herein.

Also, individually addressed commands (as opposed to globally flagged commands) will further include in the data field a unique subscriber address. Preferably, one form of unique address is programmed into each ASIC 200 at the factory. In accordance with well known technologies borrowed from the cable television field, another unique address may be encrypted and downloaded using this unique address as a key to unscramble a subscriber unique address downloaded to the game adapter 177. The terminal may also be designated with a group and/or subgroup address representing a common interest area or the like.

Another transaction useful for the so-called arcade mode of pay to play is the global time of day (TOD) which includes a filter code designating the transaction for eventual receipt by the game player 178 microprocessor. The included data includes, for example, the week number, the day of the week and the number of elapsed minutes since a certain date such as Jul. 1, 1994. The time of day, for example, is utilized for the parental timeout feature as will be described further herein.

Figure 5:
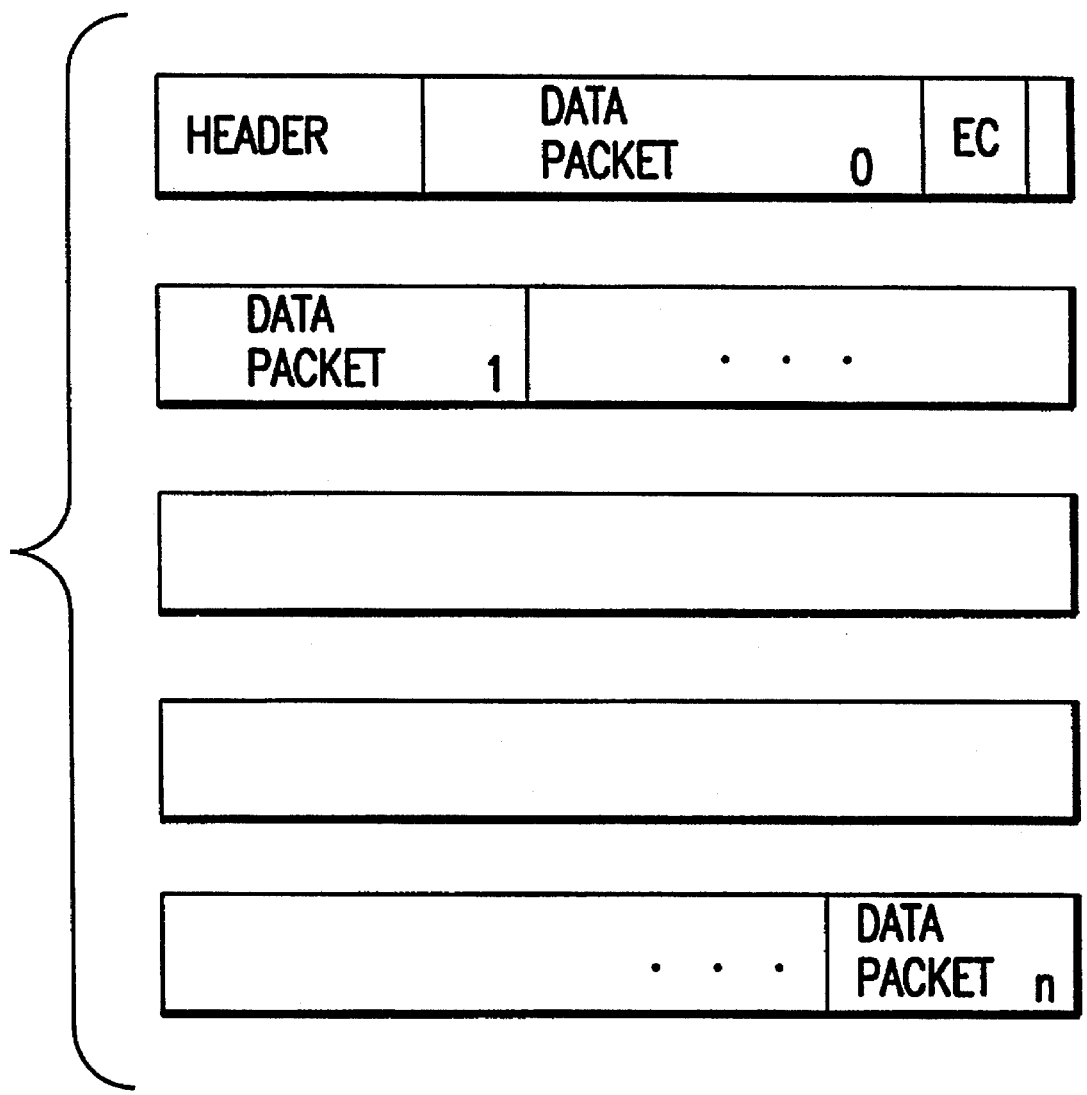
FIG. 5 provides an overview of an exemplary format for game packet data preceded by a header, each data packet 0 to n being forward error correction encoded.

Referring to FIG. 5, there is shown one format for game data. The remaining data of the subscriber frame is the actual game data. Preferably the game data for a plurality of games may be interleaved, for example, at, at least, 2:1, preferably 4:1 or even 10:1, to improve forward error correction, for example, of burst errors. Thus, the data for one game must be deinterleaved according to the interleave ratio in order to be recovered.

The present invention includes a method of authorizing and controlling so-called Pay-To-Play (PTP) marketing and distribution of game services over a cable system. To understand the present method and referring to FIGS. 4c to 4e, the concept of a game service needs to be understood, as it is the underlying basis for marketing and authorizing the game software delivery. A service (pay to play or otherwise) is a game or group of games that is associated with a specific service identifier or SID. For example, there may be 128 service identifiers or SID's; however, any SID may represent one game or many games. Each specific game is identified by a game identifier or game ID. There are enough game ID's to uniquely identify thousands or hundreds of thousands of games. The association between a service ID (SID) and specific game ID's is transmitted in the menu data to a game player 178 essentially "in the clear" from a security standpoint and is available to the game player microprocessor controller. On the other hand, the authorization for any particular service for a specific adapter 177 is transmitted by secure transactions directly into secure storage within the adapter ASIC 200. This authorization information may be read from but not written by the game controller of game player 178. When the microprocessor controller of the game player 178 desires to load a game, it loads both the game ID and the service ID (SID) into registers in the adapter ASIC 200 and requests a download operation. If and only if the service ID requested is in the secure authorization table (FIGS. 4d and 4e) in the adapter ASIC 200 for that adapter 177, does the adapter 177 begin a download operation. An implicit final condition is, of course, that a game must exist in the data stream which includes both the correct game identifier and service identifier.

Moreover, when game data is utilized in the present application, game data is intended to be used in a generic sense. Pay-To-Play is defined as the vending, on an individual or group basis, of game software for either specific play dates ("Rental" mode) or for specific playtime intervals ("Arcade" mode). For example, transactions may be individually addressed or addressed to a group address or globally addressed as is well known in the art of cable subscription television services. In the Rental mode, the subscriber purchases the right to download and play a game (or group of games) via game adapter 177 on an unlimited basis during a specific period of calendar time. The rental period is typically in terms of one or more days. In the Arcade mode, the subscriber purchases the right to download a specific game (or, alternately, a group of games) an unlimited number of times and to use the game(s) for a specific amount of playtime. The playtime is based on the actual amount of time that the game is played as opposed to clock/calendar time. The player is not penalized for stopping and starting the game or switching among games. For example, arcade play in the Arcade mode may be sold in increments of as little as one minute of playtime.

Game data then may refer or incorporate any type of information delivery, for example, software delivery services. In particular, a taxpayer may wish to rent in a rental mode a software tax package for a period of month(s) to prepare their annual tax returns. In an Arcade mode, a subscriber may wish to obtain stock market quotations, sports results and the like for a period of time.

Figure 4C:
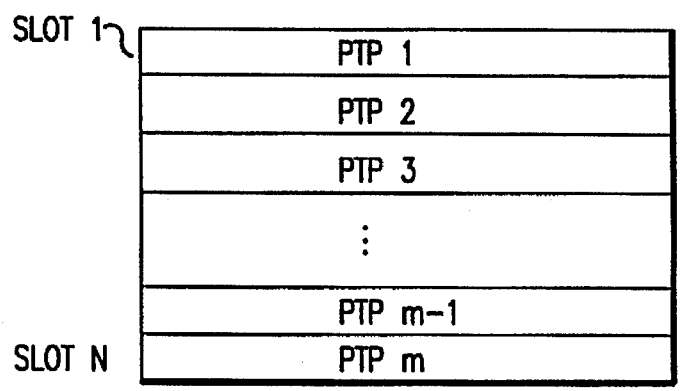

A normal operating scenario is as follows: Referring first to FIG. 4c, each adapter 177 as well as the entire system is limited, for example, to 32 total PTP services at any time (see services explanation at end of detailed description section). FIG. 4c shows a pay to play authorization table with slots SLOT1 to SLOTN where N is equal to 32. Each slot may represent authorization data for one of two modes, the slot data for each mode being shown respectively in FIGS. 4d and 4e. Each service has a unique service identifier (for example, five bits). When the subscriber orders a game, an addressed PTP Authorization transaction is transmitted to the subscriber's adapter 177 from the game delivery service provider. The PTP Authorization includes the Service ID (for example, one of 128 or 7 bits), a Load Phase (1 bit), the PTP slot ID (for example, one of thirty-two or 5 bits), the Mode (differentiating either Arcade or Rental mode) bit and either the Rental Active map (for example, 24 bits including week W and day of week DOW) or the Playtime, PT (for example, 16 bits). For example, there may be thirty-two different PTP slots each associated with a particular service. See the Definitions section for an explanation of these and other terms. The above information is also retained by a Digital Service Control System (DCS) at the local service provider location 150, not shown, (FIG. 1) or maintained nationally and periodically retransmitted for redundancy.

The subscriber's adapter 177 receives the PTP Authorization and stores the new data in a PTP table (FIG. 4c) if it determines that it is a new purchase in accordance with flowcharts of FIGS. 6 to 11 as will be further described herein. The ASIC 200 checks to see if the transaction is properly addressed and uses the PTP slot identifier as a pointer to determine where in the PTP memory table (FIG. 4d or 4e) to store the playtime data (arcade or rental), the service identifier and the load phase. The adapter uses the PTP slot identifier to index into the current data in the table. It examines the table data and, if the service identifier for the received transaction is the same as the service identifier in the table slot, it loads the new transactions data if and only if the load phase bit in the matching table entry is different from the received load phase bit. (If the load phase bits are the same, then, the new data is not loaded.) Of course, if the service identifiers are different, then, the new data for the new service overwrites what is in the slot.

When the subscriber views his PTP menu screen on display 178d of their game player 178, it indicates the contents of the PTP table (FIG. 4c) stored in game adapter memory. It associates the service identifiers with games in the menu data and displays the authorized pay to play game titles available for downloading as well as the remaining playtime available. For rental mode services, the menu screen indicates a service or game name(s) and the days on which it is available. For arcade mode services, the menu screen indicates the service or game name(s) and the amount of remaining playtime.

When the subscriber requests a game download from the PTP menu, the BIOS computer of game player 178 verifies that the requested service is valid for the current day of the week (using the previously described time of day TOD transactions, a global game player microprocessor directed transaction) if the service is Rental mode or that the available playtime is non-zero if the service is Arcade mode. If the condition is met, the adapter executes the game download by requesting the game by service identifier and game identifier (as well as PTP table location). The ASIC 200 of the game adapter 177 receives the request from the BIOS computer of the game player 178, checks the PTP table, if the PTP slot is currently authorized, the ASIC 200 initiates the download. If the requested service is not authorized in any PTP slot (or either authorization map, FIG. 4b), the game player display 178d indicates that that service is unauthorized. To prevent unlimited play in Rental mode, game play is halted with a reset after every 12-24 hours of continuous play without receiving a time of day (TOD) transaction, forcing the subscriber to initiate a new download, which rechecks the current authorization state. For Arcade mode, if the playtime ever reaches zero, game play is halted with a reset (see FIG. 3, elements 315, 350).

Game data packets are identified by headers including game time, service identifier, game identifier and packet addresses protected by forward error correction coding. In this manner, the game adapter ASIC 200 knows which selected game available of the many games in the incoming signal to accept in the download.

The DCS must nationally or locally manage the current PTP offerings. Although the system is not inherently limited to 32 total services at any given time, it is probably considerably easier to manage if the PTP table in each adapter 177 is structured with the same service identifiers SIDs in the same PTP slots. At a minimum, the DCS must always keep the current PTP Authorization data long enough to transmit it redundantly for some period of time, keeping in mind that adapters 177 are not likely to be connected to the cable plant 156 on a consistent basis. If a subscriber requests a "refresh" authorization of a previous purchase on the basis that their adapter 177 was not connected to the cable 156, the DCS must be capable of recovering the PTP Authorization data for that purchase for retransmission.

For arcade mode purchases, the authorization is effective as soon as the subscriber's adapter 177 receives the PTP Authorization transaction. The Arcade Mode bit must always be set in the PTP Authorization for arcade mode purchases so that the authorization data is interpreted correctly and the purchase is properly displayed in the subscriber's PTP menu.

As a practical matter, if the game lineup for PTP is not completely static, arcade mode PTP purchases may be sold with some nominal time limit (such as two weeks) during which the subscriber must use the playtime, else it is lost. If this limit is to be proactively enforced, the DCS must manage the time limit for each purchase and send an addressed Purge PTP Slot transaction when the PTP period expires. (For example, the addressed Purge PTP Slot transaction may be an addressed PTP authorization with all PTP data fields set to zero.) Alternately, the limit can be passively enforced by limiting sales of a service with respect to when a particular PTP slot is planned to changed services. For example, assume that the arcade mode time limit is two weeks and a particular PTP service is planned to be phased out. Sales of this service would be stopped two weeks prior to the planned change in use of the PTP slot for that service. At the end of the two weeks a global Purge PTP Slot is transmitted to clear out the slot used for the terminated service. The global purge PTP Slot transaction may be a global PTP Authorization with all data fields (except slot number) set equal to zero.

If rental mode purchases are implemented, the authorization is valid whenever the current "day" and "week" in the TOD transaction matches any one of the "days" and associated "week" specified in the Rental Active Map. Since the Rental Active Map only has enough bits, for example, two consecutive "weeks", it is really only feasible to allow purchases of up to any seven consecutive days. Any longer period can overlap more than two consecutive week periods. Although preloading PTP rentals in advance of the rental period is possible, this preload interval should probably be kept to a minimum so that DCS never has to manage a queue of rentals for any slot. Furthermore, DCS (or the billing system) must keep track of the rental period and slot ID for each purchase and not allow authorization of new purchases of a service associated with that slot until the current rental period expires. The DCS does not have to deauthorize rental mode PTP services, this is taken care of by the adapter 177 (see Detailed Adapter Operation section below).

The term "day" is applied to the minimum rental period and is actually an arbitrary amount of time. The rental mode supports two consecutive groups of up to eight consecutive rental periods; each group is therefore termed a "week" and only seven of the eight "day" bits are utilized. The functional definition of each "day" bit in the Rental Active Map is, in fact, determined by when the corresponding bits are generated in the Day-of-Week field in the Time-of-Day (TOD) transaction. In a realistic implementation, one day is probably a serviceable minimum rental period. As a practical matter, the duration of each "day" bit in the TOD transaction should somewhat overlap to make sure that a subscriber never experiences a "hole" in availability. Also, the "user friendly" aspect of cartridge rental can be emulated. For example, a weekend rental would be authorized by setting the "Saturday" and "Sunday" bits in the Rental Active Map and granting approximately 48 hours (maximum) of playtime. However, when the DCS generates the TOD transactions, it would actually set the "Saturday" bit at 7:00 PM on Friday, overlapping the "Friday" bit for five hours and including Friday evening at the "weekend".

Detailed Adapter Operation

When the adapter game controller ASIC 200 receives a properly addressed PTP Authorization, it uses the PTP slot ID simply as an index to determine where in the PTP table to access the current data in the table. It examines the table data and, if the service identifier SID for the received transaction is the same as the SID in the table slot, it loads the new transaction data if and only if the Load Phase bit in the matching table entry is different than the received Load Phase bit. If the received service identifier SID is different than the SID in the table, then the transaction data is always loaded into the PTP table slot. The transmitted Load Phase bits must be maintained by the DCS such that the value of the bit for any given service and adapter does not change except when an actual new purchase is made. Note that this requires DCS to maintain a history of the current Load Phase bits for all 32 PTP offerings for each and every PTP adapter. This allows the PTP Authorize transaction to be sent multiple times without inadvertently "refreshing" the Playtime.

To start PTP downloading, the subscriber goes to the PTP menu displayed on display 178d. The basic input and output system (BIOS) computer of game player 178 reads the PTP table. It associates the service identifiers (SID) with games in the menu data and displays the authorized PTP game titles available for downloading. For rental mode, this depends upon how the Rental Active Map for each PTP slot matches with the Day-of-Week field in the current TOD transaction. For arcade mode purchases, the BIOS computer of the game player 178 displays the remaining Playtime available for each game. When a game is selected, the BIOS computer requests a PTP download of the game, using the Service ID and Game ID codes, as well as the PTP table location. The ROM BIOS must insure that it never allows the subscriber to request a Rental PTP service to be downloaded which is not currently authorized. If a download is requested prior to the actual authorized rental period the authorization for that PTP service is permanently lost (see Rental Mode Downloads and Preload Period).

Arcade Mode Downloads

When the adapter ASIC 200 receives a request for a PTP download, it checks the data in the requested slot in the PTP table. If the Arcade Mode bit is set in the requested PTP slot, on the condition that (1) the Service IDs match AND (2) the playtime is non-zero, it authorizes the download by transferring the service identifier SID and Game ID into the actual Header/Packet Filter match registers. It also sets a Game Authorized register that is a required condition for the adapter 177 to enter a Game Play mode.

Whenever the currently loaded game is associated with an Arcade mode PTP slot, each time that the adapter ASIC 200 detects a switch to Game Play mode, the ASIC immediately decrements playtime in that PTP slot by one unit. This is the minimum playtime used each time the game is restarted, i.e., you pay "up front" when you play. After each subsequent time unit of active play, the playtime is again decremented by the ASIC 200. When the playtime decrements to zero, the ASIC asserts RESET to stop game play. Because, presently the adapter 177 cannot detect when the game is placed in "pause" mode, the time that a game spends in pause may be counted as active playtime and the playtime counter may be decremented.

Rental Mode Downloads

When the adapter ASIC 200 receives a request for a PTP download, it checks the data in the requested slot in the PTP table. If the Arcade Mode bit is not set in the requested PTP slot, downloading is authorized under the following conditions:

(the Week field in the TOD transaction matches the PTP slot Week Code and one or more bits in the Day-of-Week field in the current TOD matches one or more bits in the first week field of the Rental Active Map) OR (the Week field in the TOD transaction matches the PTP slot Week Code+1 and one or more bits in the Day-of-Week field in the current TOD matches one or more bits in the second week field of the Rental Active Map).

If the above conditions are met, the adapter ASIC 200 authorizes the download by transferring the service identifier SID and Game ID into the actual Header/Packet Filter match registers. It also sets a Game Authorized register that is a required condition for the adapter to enter Game Play mode.

At this point a timer is started which runs for 12 to 24 hours. If the game is still in play at then end of this timer period and a time of day transaction has not been received, the game play is terminated with a reset. This forces a reload of the game, if the subscriber wishes to continue play, which includes a recheck of the authorization. This is to insure that a subscriber cannot download a game and then play it for considerably longer than the actual rental period.

If the above conditions are not satisfied, then the adapter ASIC resets both the Load Phase bit and the SID for the requested PTP slot to zero. This effectively deauthorizes that PTP rental. As a normal part of the Download Menu phase of game startup, the ROM BIOS must search through the PTP table for all Rental mode slots which have Week Code fields that are not within the range of the current week and current week plus the Preload Period (typically two or three weeks). When the ROM BIOS detects a PTP slot with a Week Code outside of this range, it requests a PTP download for that slot. The adapter ASIC will determine that the service is no longer authorized and deauthorized that slot. The deauthorization process is extremely fast and does not burden the ROM BIOS with undue delays. Note that during this PTP slot "purge" process the ROM BIOS must never request a download of PTP slots that have valid Week Codes, as this could result in the premature deauthorization of a PTP slot.

Definitions

PTP Slot

The PTP slot specifies an index into in the PTP memory table the adapter 177 uses to store/access the four bytes of PTP data fields. This allows the Game Controller System (GCS) to manage the table rather than placing this burden on the adapter 177.

Service ID (SID)

The service identifier is a unique identifier for a game or group of games that are being marketed together. The games associated with each SID are defined in the Menu Data. One SID is controlled with each PTP slot or Authorization Map bit. See services explanation at the end of the document for more detail.

Playtime

Maximum mount of actual game playing time that is available for the SID in a PTP slot. The adapter decrements this quantity as the game(s) associated with the SID is played. When the playtime reaches zero, playing is suspended and the game(s) with that SID is not longer downloadable. A very real tradeoff exists between the size of the playtime timer (cost) and the minimum time increments for this timer (utility and subscriber "friendliness"): The granularity of the timer must be fine enough that the time lost by the "pay up front" scenario does not cause undue irritation to the subscriber. However, the timer must be long enough to support reasonable arcade mode rental periods. For example, if an eight bit timer is used and the timer granularity is one minute, then the maximum playtime is 255 minutes or 4.25 hours, which seems rather short, and the user loses a minimum of one minute of playtime whenever he starts playing, which seems borderline "unfriendly" as well. Therefore a sixteen bit counter is used with a time interval of 10 seconds. This results in a maximum playtime of 182 hours or 7.6 days and a minimum startup "irritation" factor.

Rental Active (RA) Map

The RA map specifies the "days" on which the adapter 177 is authorized to down load the game(s) associated with the SID in a PTP slot. It consists of a cyclic Week Code field and an Rental Active field. The Rental Active field is a bit mapped field for which one or more specific its are set corresponding to the specific days of the week that the subscriber purchased (the Saturday and Sunday bits for a weekend rental, for example). The length of the Rental Active map is two weeks so that rentals periods can overlap one week boundary. The Week Code is simply a sequence number which identifies the first week in the Rental Active field. The sequence number for the second week in the Rental Active field is Week Code+1. The Week Code is a six bit field and uses a 0–63 sequence which rolls over to zero again after 63.

Load Phase

The load phase is used as a security method to insure that multiple transmissions of the PTP Authorization transaction do not "refresh" the playtime. When a PTP Authorization is retransmitted for redundancy purposes, the value of this field is held constant. When a PTP Authorization is transmitted that contains a new purchase, the value of the load phase is changed.

Preload Period

This is the maximum number of weeks into the future that the DCS would ever send out as a valid Week Code. That is, if the preload period is added to the current Week Code, then the result is potentially a valid Week Code in a PTP Authorization. The Preload Period is used by ROM BIOS when purging the PTP table of outdated rental mode services. If the Week Code in a (rental mode) PTP slot is within the range of the current Week Code and current Week plus the Preload Period, then it is valid and no action is taken. If it is outside of this range, then a "download" of the service in that slot is requested. When the adapter ASIC performs an authorization check on the PTP slot, it will fail and the slot is deauthorized. The Preload Period is sent to adapters as part of the ASIC Addressed Adapter Control transaction.

Services

The concept of a game "service" needs to be understood thoroughly, as it is the underlying basis for marketing and authorizing the game software. A "service" (PTP or otherwise) is a game or group of games that is associated with a specific Service ID (SID). There are currently only 127 possible SIDs (SID of zero is reserved), however any SID may represent one game or many games. Each specific game is identified by a Game ID. There are enough Game IDs to uniquely identify thousands of games. The association between the service ID's (SID's) and specific Game IDs transmitted in the menu data essentially "in the clear" from a security standpoint and is available to the microprocessor controller basic input/output system (BIOS). On the other hand, the authorization for any particular service for a specific adapter 177 is transmitted by secure transactions directly into secure storage within the adapter ASIC 200. The authorization information may be read but not written by the game player controller. When the microprocessor controller desires to load a game, it loads both the Game ID and the Service ID into registers in the adapter ASIC and requests a download operation of the adapter 177. If and only if the SID requested is in the secure authorization map (FIG. 4b) or PTP slot table (FIGS. 4c to 4e) for that adapter 177, the adapter begins a download operation. (Additional playtime and rental active conditions apply to PTP download requests.) An implicit final conditions is, of course, that a game must exist in the data stream which has both the correct Game ID and Service ID in the superpacket Superframe Header.

Game Adapter 177 Software Flowcharts

Figure 6:
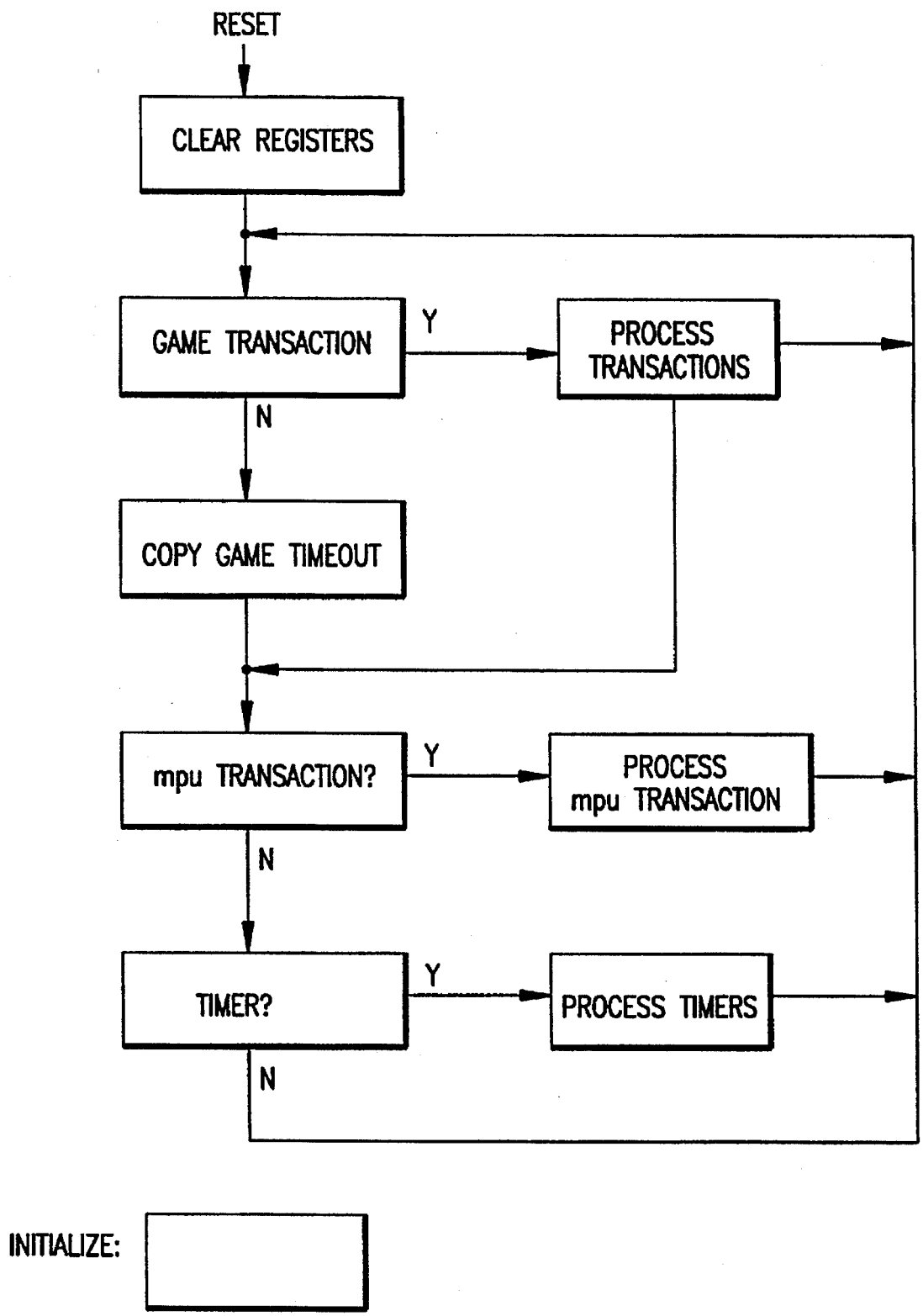
FIG. 6 provides an overall flowchart for processing incoming authorization and control data which calls upon farther flowcharts FIGS. 7–11 as will be further described herein.

Flowcharts for the overall operation of ASIC 200 are described in connection with FIGS. 6–10. Referring first to FIG. 6, there is provided a master flowchart showing the overall sequence of operations. Upon reset, all registers are cleared and an incoming data stream is regarded first for transaction data. If transaction data is present, indicated by Y, then the process transactions routine is followed per FIG. 7. If the data does not represent a transaction, indicated by N, the program follows to a copy game timeout box. Then, the incoming data is regarded to determine if the data represent a game player microprocessor transaction, if so then, the process mpu transaction routine is operated per FIG. 9. Otherwise, the program proceeds to question whether the timer bit is set, if yes, Y, then, the process timers routine is practiced per FIG. 11. The control program then returns to examine the next data.

Figure 7:
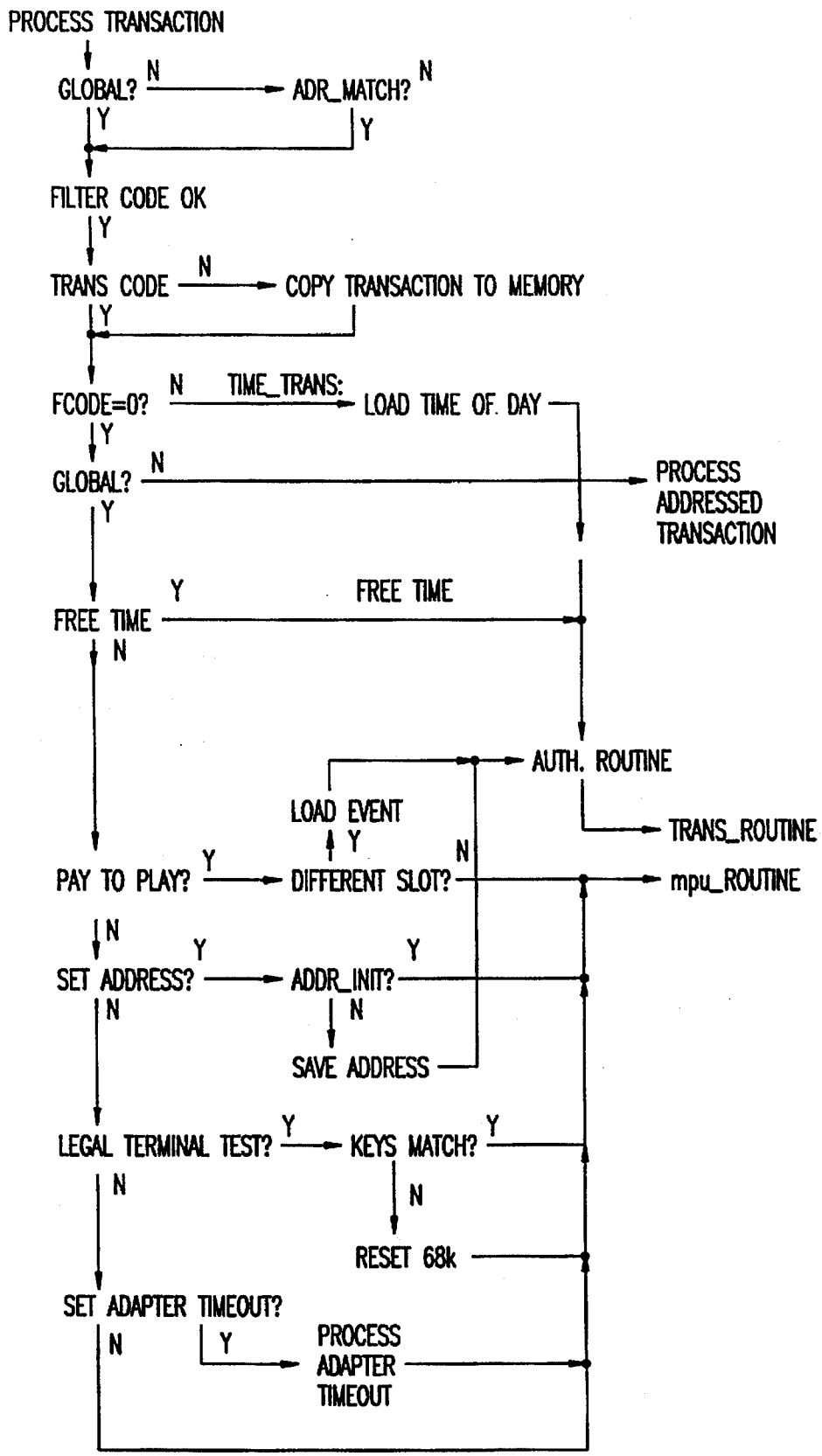
Figure 8:
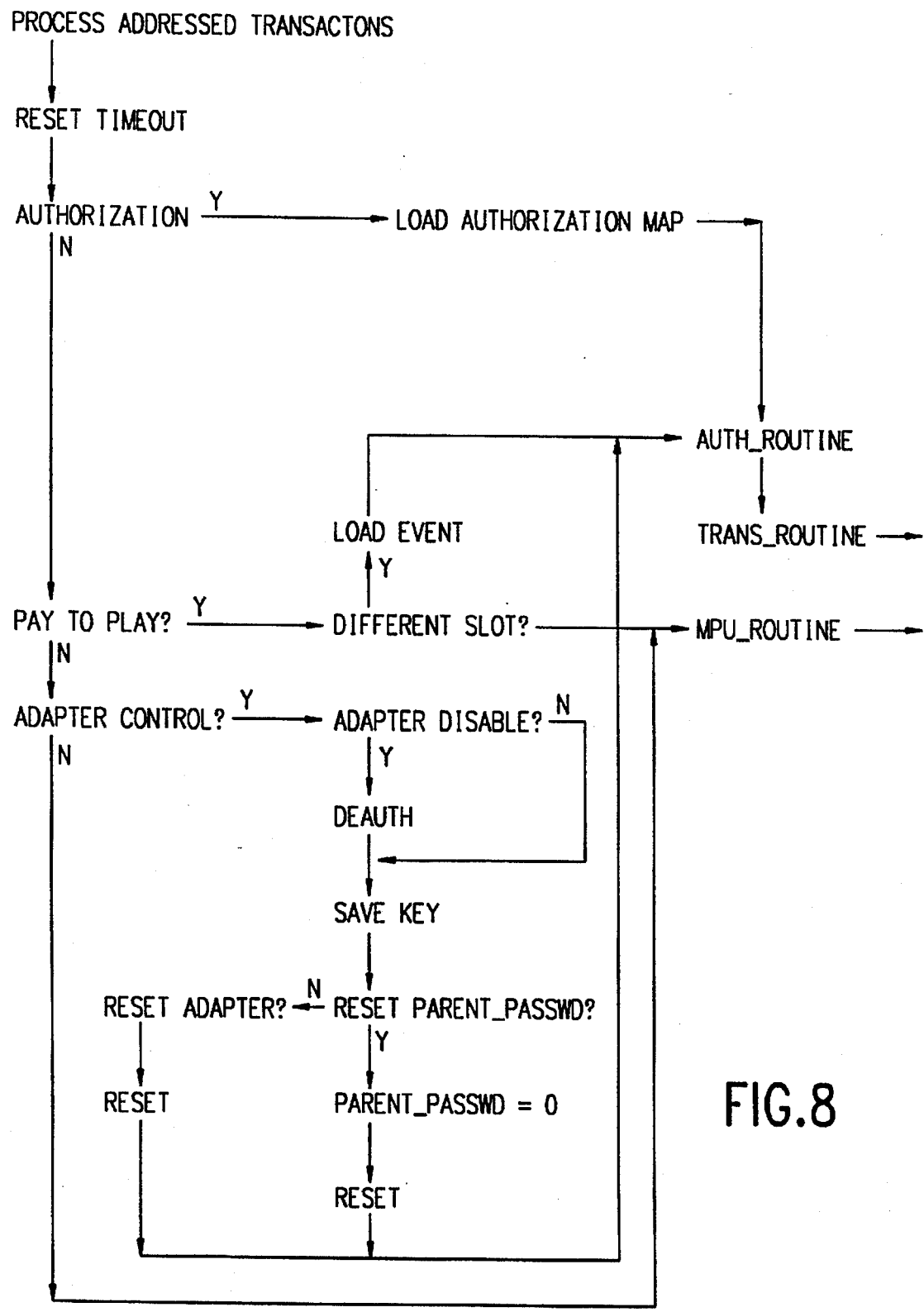
Figure 10:
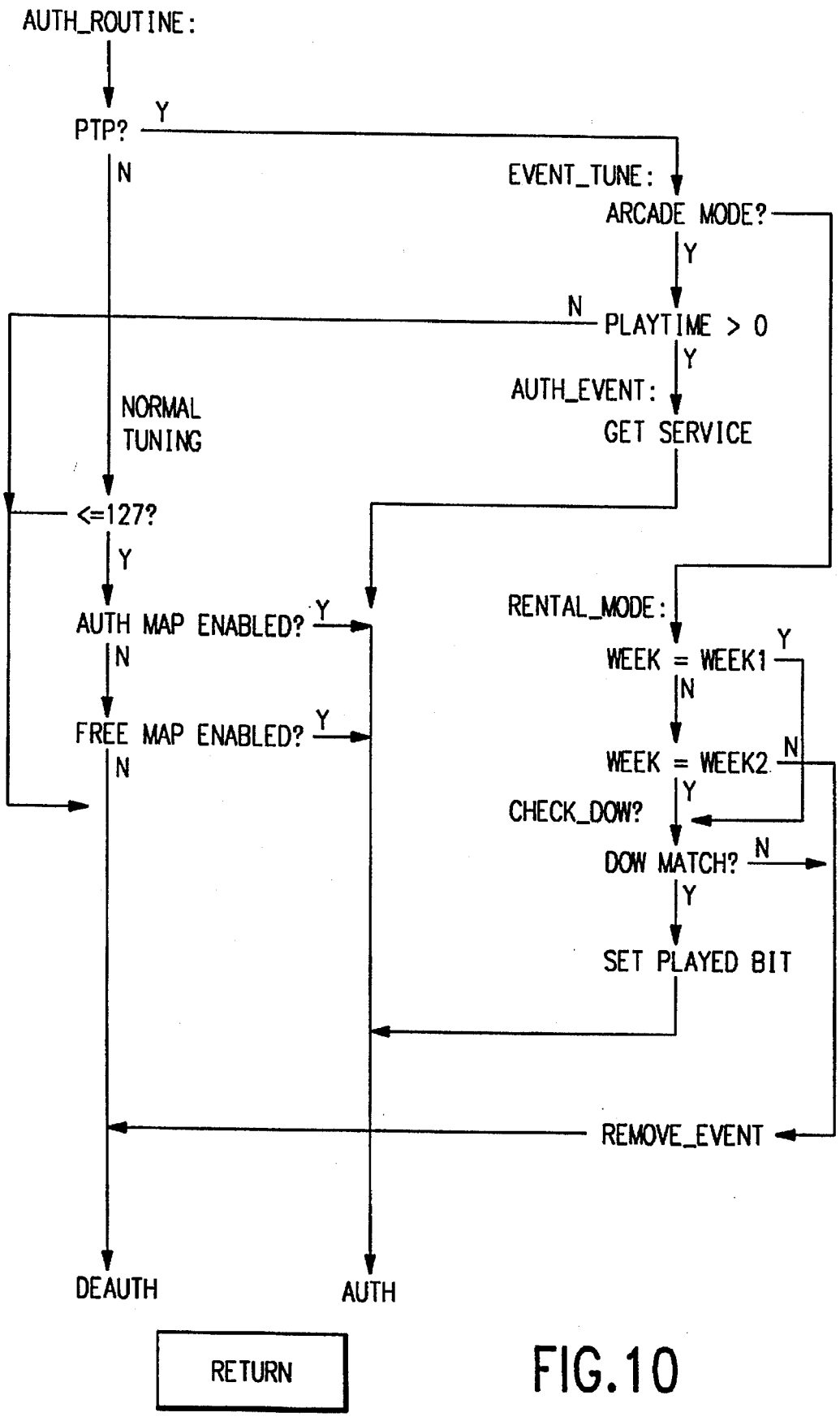

The process transactions routine is described by FIGS. 7 to 8 and 10. As described above, transactions contain a global flag which is regarded first (see FIG. 4a). If the flag is not set and the address does not match, then the transaction data is ignored.

If the global flag is set and the filter code matches an expected filter code for game adapter or game player or other device, then the transaction code is regarded. If the filter code indicates the transaction is for the micro via the N path, the time of day (a time of day transaction being assumed) is loaded and the routine passes to an authorization routine per FIG. 10 and return to the process transactions routine. If the global flag is not set, the transaction must be addressed and the routine passes control to FIG. 8 which shows a routine for processing particularly addressed transactions.

Figure 4D:
Figure 4E:
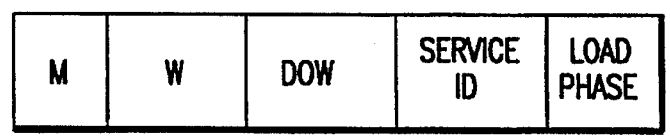

On the other hand, if the transaction is global, then, free time authorization maps are loaded per FIG. 4b and control proceeds on to FIG. 10 and back. Otherwise, the routine proceeds to the pay to play transaction box. If this is a pay to play transaction, then the slot is regarded, if the slot is different, then the transaction is loaded into pay to play tables (FIGS. 4c to 4e). Otherwise, the mpu routine is followed per FIG. 9.

Other possible transactions include as per FIG. 7 a set address transaction to set a new adapter address, a legal terminal test consistent with legal terminal tests known in the cable television arts, and an adapter 177 timeout setting routine.

FIG. 7 global? being no, N, leads to FIG. 8. FIG. 8 relates to processing addressed transactions. Timeout is reset and the subscription service authorization map (per FIG. 4b) is loaded with new subscriber authorization data followed by a shift of control to FIG. 10 and return to the transaction processing routine. Pay to play proceeds as with a global pay to play to determine whether the slot is the same and if not data from the transaction is loaded into a table per FIG. 4c.

Another addressed transaction per FIG. 8 is the adapter control transaction which can disable a particular adapter, for example, for non-payment of subscriber bills and the like. The adapter control transaction further may be optionally utilized to change security keys, reset the adapter or reset parental passwords from the control center.

Figure 9:
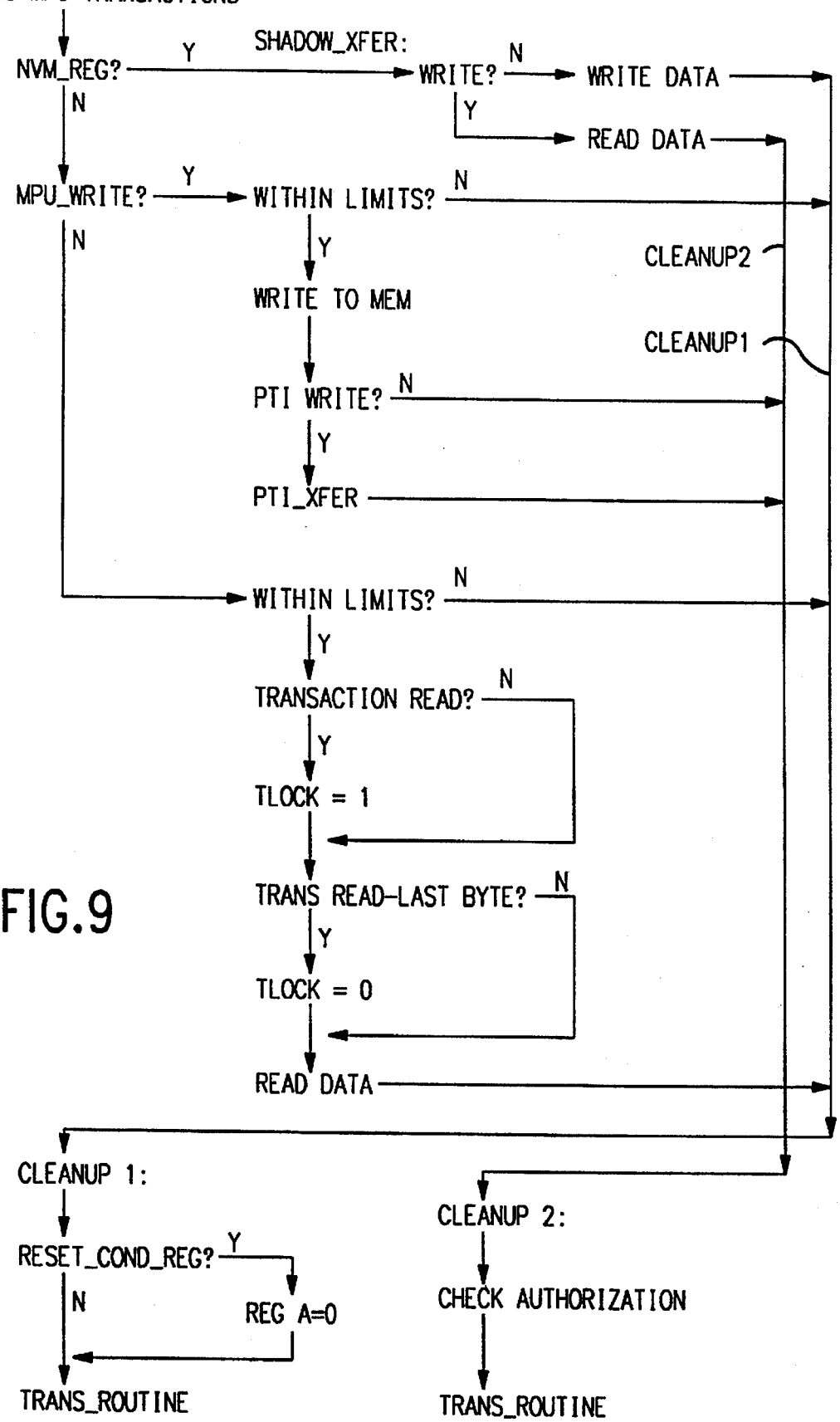

FIG. 9 is arrived at from FIG. 6 or FIG. 8. Data is written or read into memory for access by the game player microprocessor. The end result of the MPU transaction processing routine is to return to the transactions processing routine, FIG. 7.

FIGS. 7 or 8 lead to FIG. 10. The end result of FIG. 10 is an authorization or a deauthorized bit setting read from authorization map memory. The vertical path from PTP Yes determines arcade or rental mode, whether playtime is non-zero in arcade mode and, if rental mode (arcade mode No path), the week and day of week, for example, assuming a two week interval. If PTP? is N for no, then, the subscription service and free service authorization maps are checked to see if a requested service is authorized AUTH or not DEAUTH.

Figure 11:
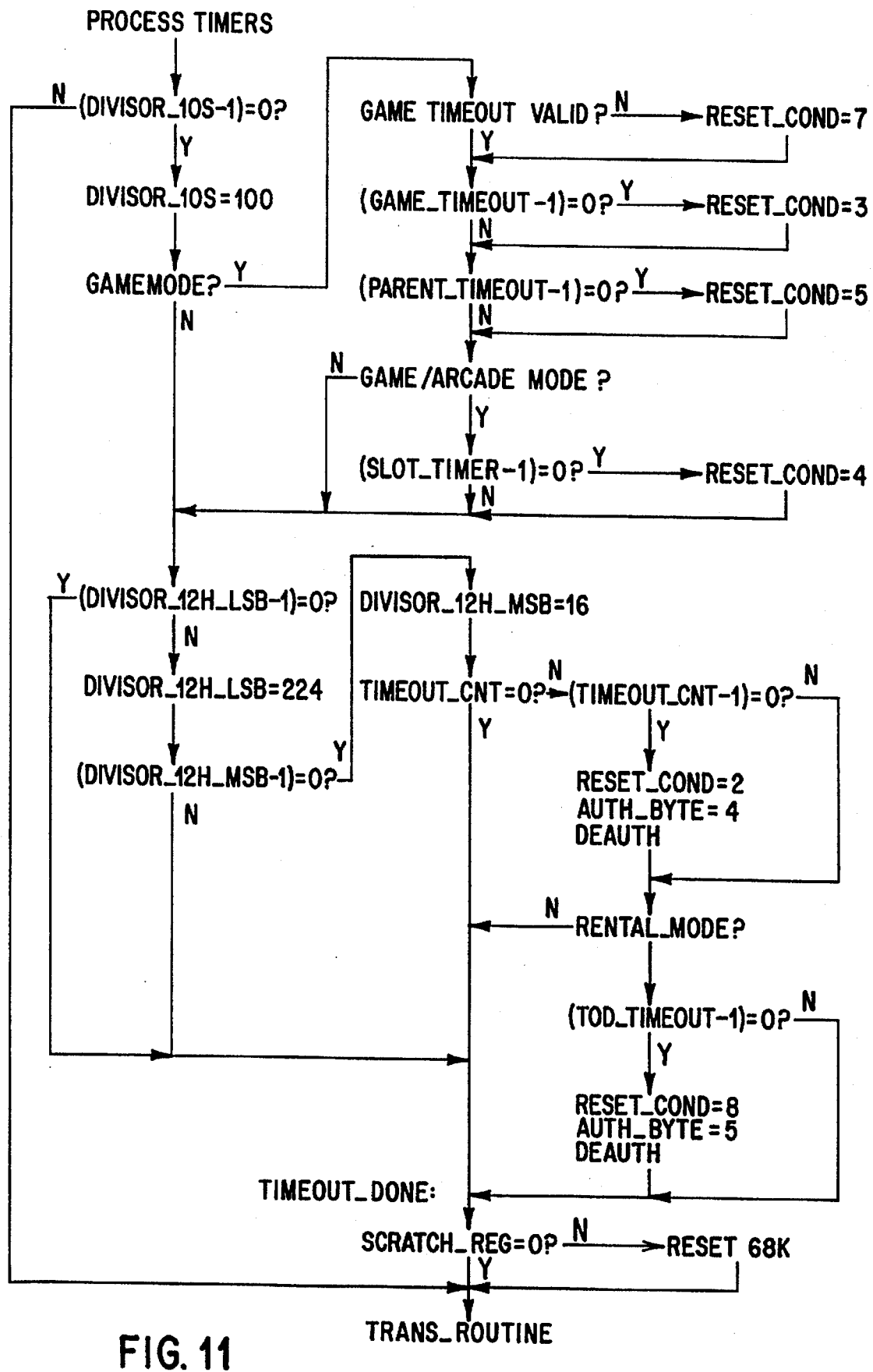

FIG. 11 is arrived at from FIG. 6 and relates to timer processing for game timeout, arcade/rental mode timeout and parental control timeout. Timers or counters are decremented one count where a time count of one, for example, is equal to ten second intervals. When a particular timer is exhausted, then, the reset program is enabled ending game play.

Thus, there has been described method and apparatus for secure authorization and control of game delivery services wherein a plurality of levels of security may be provided to proprietary game data and for authorization and control data to prevent invasion by service pirates. These levels include, but are not limited to, channel frequency diversity, first and second data interleaving steps, data encryption, decompression and forward error correction. Moreover, the game adapter/game player interface is protected against interception of communication by a pirate because the game player only knows the association between service identifier and game identifier and not authorization data which can only be read from, not written to, by the game player. Importantly, the ASIC 200 is secure from pirates while the game player treats the game adapter as if it were a game cartridge and no modification is necessary to game players already commercially available to take advantage of the above-described game delivery service.

We claim:

1. A communications system for the delivery of digital data programs to a remote location, said system comprising:

a transmitter for transmitting a signal comprising said digital data programs;

a communications terminal located at said remote location and having a control circuit responsive to authorization data for authorizing said communications terminal to access an authorized one of the digital data programs in one of a first and a second authorization mode, said first authorization mode for authorizing said communications terminal to access authorized digital programs on an unlimited basis during a predetermined calendar time period regardless of program access time and said second authorization mode for authorizing said communications terminal to access authorized digital data programs for a predetermined program access time period regardless of calendar time.

2. The communications system according to claim 1, further comprising a calendar time clock for recording calendar time wherein, during the first authorization predetermined authorization when the calendar date and time compare with a predetermined authorized calendar date and time.

3. The communications system according to claim 1, further comprising a program access timer which records cumulative time of access to program data wherein, during the second authorization mode, authorization ceases when the program access time accumulated in said program access timer exceeds a predetermined authorized program access time.

4. The communications system according to claim 1, wherein said authorized distal data programs are different from one another and said control circuit further includes a program access counter for setting the predetermined access time period, wherein said counter is decremented when said communication terminal accesses the different authorized digital data programs in either authorization mode.

5. The communications terminal according to claim 2, wherein wherein authorization ceases and access to program data is denied during access to particular game data when the clock records the predetermined authorized calendar date and time.

6. The communications system according to claim 1, wherein said first authorization mode authorizes said communication terminal to access a first authorized one of the digital data programs on an unlimited basis during a predetermined calendar time period and said second authorization mode authorizes said communication terminal to access a second authorized one of the digital data programs for a predetermined access time period.

7. The communications system according to claim 6, wherein said communications terminal further comprises:
a display for displaying the predetermined calendar time period for the first authorized one of the digital data programs and for displaying the amount of access time remaining for the second authorized one of the digital data programs.

8. The communications system according to claim 1, wherein the authorization data is transmitted with the signal.

9. The communications system according to claim 8, wherein the authorization data includes data for setting said first or said second authorization mode.

10. The communications system according to claim 1, wherein the digital data programs comprise video game programs.

11. The communications system according to claim 1, wherein the digital data programs comprise software programs.

12. The communications system according to claim 1, further comprising:
a program selector for variably selecting an authorized one of said digital data programs; and
a memory for storing selected digital data programs.

13. The communications system according to claim 12, wherein said control circuit further includes an interface for interfacing said memory to an external device, wherein a processor of said external device is capable of executing digital data programs stored in said memory.

14. The communications system according to claim 1, wherein said communications terminal further comprises a tuner for tuning said signal.

15. The communications system according to claim 14, wherein said tuner includes a phase-locked loop, said memory further stores tuning data, and said control circuit supplies the tuning data to said phase-locked loop.

16. The communications system according to claim 1, wherein the signal comprises multiplexed digital data programs and said control circuit further includes demultiplexing circuitry for demultiplexing the multiplexed digital data programs.

17. The communications system according to claim 1, wherein the signal comprises encrypted digital data programs and said control circuit further includes decrypting circuitry for decrypting said encrypted digital data programs.

18. The communications system according to claim 1, wherein the signal comprises encrypted and multiplexed digital data programs and said control circuit further includes decrypting circuitry and demultiplexing circuitry for decrypting and demultiplexing the encrypted and multiplexed digital data programs.

19. The communications system according to claim 1, wherein the signal comprises compressed digital data programs and said control circuit further includes decompressing circuitry for decompressing said compressed digital data programs.

20. The communications system according to claim 1, wherein said control circuit further includes a periodic reset circuit for periodically resetting said communications terminal during access of a digital data programs depending on the expiration of a program access time.

21. The communications system according to claim 1, wherein said digital data programs comprise video games and said control circuit authorizes access to parentally authorized ones of said digital data programs only during parentally authorized and predetermined time of day periods and according to a rating for program content.

22. A communications system for the delivery of digital data programs to a remote location, said system comprising: a transmitter for transmitting a signal comprising said digital data programs and a communications terminal located at said remote location wherein said digital data programs are arranged in services, wherein each service comprises one or more digital data programs, and said communications terminal comprises a control circuit responsive to service authorization data for authorizing said communications terminal to access authorized ones of said services, said control circuit for receiving service identification data of said service authorization data specifically addressed to said terminal and for receiving service definition data for defining service identification data of said one or more distal data programs addressed to a plurality of terminals including said specifically addressed terminal.

23. The communications system according to claim 22, wherein said service authorization data is transmitted with the signal.

24. The communications system according to claim 23, wherein said service authorization data comprises a service authorization bit map, the service authorization bit map comprising a plurality of bits each corresponding to a respective one of said services.

25. The communications system according to claim 13, wherein said communications system comprises a plurality of communications terminals and said service authorization data includes first authorization data defining services for which all communications terminals are authorized and second authorization data defining services for which a respective communications terminal is authorized.

26. The communications system according to claim 25, wherein said first authorization data is transmitted as a global transaction to all communications terminals and said second authorization data is transmitted as an addressed transaction to a respective one of said communications terminals.

27. The communications terminal according to claim 22, wherein said control circuit includes a memory for storing said service authorization data.

28. The communications system according to claim 22, wherein the signal comprises multiplexed digital data programs and said control circuit further includes demultiplexing circuitry for demultiplexing the multiplexed digital data programs.

29. The communications system according to claim 22, wherein the signal comprises encrypted digital data programs and said control circuit further includes decrypting circuitry for decrypting said encrypted digital data programs.

30. The communications system according to claim 22, wherein the signal comprises encrypted and multiplexed digital data programs and said control circuit further includes decrypting circuitry and demultiplexing circuitry for decrypting and demultiplexing the encrypted and multiplexed digital data programs.

31. The communications system according to claim 22, wherein the signal comprises compressed digital data programs and said control circuit further includes decompressing circuitry for decompressing said compressed digital data programs.

32. The communications system according to claim 22, wherein said control circuit further includes a periodic reset circuit for periodically resetting said communications terminal during access of authorized digital data programs depending on the expiration of a program access time.

33. The communications system according to claim 22, wherein said digital data programs comprise video games and said control circuit authorizes access to parentally authorized ones of said digital data programs only during parentally authorized and predetermined time of day periods and according to a rating for program content.

34. A communications system for the delivery of digital data programs to a plurality of remote locations, said system comprising:

communications terminals located at said remote locations;

a transmitter for transmitting a signal comprising said digital data programs, first authorization data for authorizing all of said communications terminals to access first authorized ones of said digital data programs for predetermined program access periods, and second authorization data for authorizing respective ones of said communications terminals to access second authorized ones of said digital data programs regardless of said predetermined program access periods.

35. The communications system according to claim 28, wherein said first authorization data is transmitted as a global transaction to all of said communications terminals and said second authorization data is transmitted as an addressed transaction to respective ones of said communications terminals.

36. A communications system for the delivery of digital data programs to a remote location, said system comprising:

a control system for transmitting a signal comprising said digital data programs and authorization transactions, said authorization transactions including identifier data corresponding to one or more of said digital data programs, load phase data, and memory slot data; and a communications terminal located at said remote location, said communications terminal including:

a memory for storing an authorization table for authorizing said communications terminal to access authorized ones of said digital data programs, said authorization table including a plurality of memory slots, each slot including a first field for storing load phase data and a second field for storing identifier data; and a control circuit for processing said authorization transactions using said memory slot data to access one of said memory slots of said authorization table, wherein said identifier data is loaded into the corresponding memory slot (1) if identifier data currently stored in the corresponding memory slot corresponds to the identifier data in the processed authorization transaction and load phase data currently stored in the corresponding memory slot differs from the load phase data in the processed authorization transaction or (2) if identifier data currently stored in the corresponding memory slot differs from the identifier data in the processed authorization transaction.

37. The communications system according to claim 36, wherein said control system includes a memory for storing the current phase of the load state data for each memory slot in each of said communications terminals, whereby authorization transactions may be sent multiple times.

38. The communications system according to claim 36, wherein said authorization transactions include mode data for defining one of a first and second authorization modes and each memory slot of said authorization table includes at least one field for storing said mode.

39. The communications system according to claim 38, wherein said first authorization mode authorizes said communication terminal to access authorized digital data programs on an unlimited basis during a predetermined calendar time period.

40. The communications system according to claim 38, wherein said second authorization mode authorizes said communication terminal to access authorized digital data programs for a predetermined access time period.

41. The communications system according to claim 38, wherein said first authorization mode authorizes said communication terminal to access authorized digital data programs on an unlimited basis during a predetermined calendar time period and said second authorization mode authorizes said communication terminal to access authorized digital data programs for a predetermined access time period.

42. A method of providing video game program services from a central service center to a plurality of remotely located communications terminals, wherein each video game program service comprises one or more video game programs, the method comprising:

a first step of transmitting from said central service center a signal including video game program data;

a second step of transmitting from said central service center a first authorization transaction for defining first video game program services which are accessible to all of said communications terminals for predetermined periods of program access time; and a third step of transmitting from said central service center second authorization transactions, each second authorization transaction being respectively addressed to a corresponding communications terminal and defining second additional video game program services which are accessible to the respective corresponding communication terminal for variable periods of program access time.

43. The method according to claim 42, wherein the first authorization transaction comprises a first service authorization table and the second authorization transaction comprises a second service authorization table, each of said first and second service authorization tables comprising a plurality of entries each corresponding to a respective one of said video game program services.

44. The method according to claim 42, further comprising:

a fourth step of transmitting from said central service center third authorization transactions, each third authorization transaction defining in which one of a plurality of access modes a respective corresponding one of said first video game services is accessible to all of said communications terminals.

45. The method according to claim 42, further comprising:

a fourth step of transmitting from said central service center fourth authorization transactions, each fourth authorization transaction being respectively addressed to a corresponding communications terminal to which second additional video game program services are accessible and defining in which of a plurality of access modes a respective corresponding one of said second additional video game program services is accessible by the communications terminal.

46. A secure home communications terminal for game services comprising a secure game controller for 1) tuning to a game channel frequency 2) demodulating a game data and authorization and control data stream, an authorization and control data stream comprising globally addressed and specifically addressed game service authorization data 3) deserializing and deinterleaving received data 4) decrypting received data and 5) storing certain of said authorization data in secure memory and a game player adapted for plug-in connection to said game controller, said game player for retrieving game data only upon authorization, said authorization data, stored in secure memory of said secure game controller, being accessible by a controller of said game player for reading and not writing.

* * * * *